United States Patent Office 3,133,125
Patented May 12, 1964

3,133,125
PROCESS FOR PREPARING PENTA-
FLUOROIODOETHANE
John J. Drysdale, Wilmington, Del., and Viktor Weinmayr, Landenberg, Pa., assignors to E. I. du Pont de Nemours and Company, Wilmington, Del., a corporation of Delaware
No Drawing. Filed May 23, 1961, Ser. No. 111,911
8 Claims. (Cl. 260—653.7)

This invention relates to a new and improved process for preparing pentafluoroiodoethane and particularly for preparing such compound in high yields and high purity.

Pentafluoroiodoethane is known to be an important intermediate for the preparation of fluorocarbon compounds. It can be reacted with olefines or fluoroolefines to give higher molecular weight iodides, or with metals, such as mercury, to give fluorine-containing metal compounds which are useful as polymerization initiators.

A number of methods for the preparation of pentafluoroiodoethane are described in "Fluorine Chemistry," J. H. Simons, ed., vol. II, p. 366, Academic Press, N.Y., 1954. Among these methods is the conversion of tetrafluoro-1,2-diiodoethane to pentafluoroiodoethane by heating it with iodine pentafluoride. [See also Emeleus, J. Chem. Soc. 2948 (1949).] This method presents several difficulties when applied to large scale manufacture. Iodine pentafluoride itself is not an economical nor easily handled material. It must be made from iodine and fluorine, and its use is nearly as hazardous as that of elemental fluorine. The excess iodine remaining in the reaction vessel sublimes, thereby plugging the lines and causing corrosion.

It is an object of this invention to provide a new and improved process for preparing pentafluoroiodoethane. Another object is to provide a process for preparing pentafluoroiodoethane of exceptional purity in high yields. A further object is to provide a process for preparing pentafluoroiodoethane in a relatively safe and convenient manner from readily available starting materials. A still further object is to advance the art. Still other objects will appear hereinafter.

The above and other objects may be accomplished in accord with this invention which comprises heating to a temperature of from about 40° C. to about 125° C. in a closed vessel under autogenous pressure 2 moles of tetrafluoro-1,2-diiodoethane, from about 1 to about 2.2 moles of mercuric oxide, and at least 6 moles of hydrogen fluoride for each mole of mercuric oxide, and recovering pentafluoroiodoethane from the reaction mixture.

It has been found that, by the process of this invention, pentafluoroiodoethane of exceptional purity is readily obtained in high yields, the starting materials are readily available, and their use in the process does not present the hazards involved in prior known processes. The reaction is specific, giving only pentafluoroiodoethane as the product, i.e. it does not result in the replacement of both iodine atoms of the tetrafluoro-1,2-diiodoethane, or the coupling of starting material and product to form higher molecular weight perfluoroalkyliodides, or other side reactions.

The tetrafluoro-1,2-diiodoethane starting material may be obtained by known means. Conveniently, it can be made by reacting tetrafluoroethylene with iodine as described by M. S. Raasch in U.S. Patent 2,424,667. It may be used as obtained by the above-mentioned reaction just after filtration from the unreacted iodine, or the unreacted iodine may be removed by washing with sodium bisulfite or sodium thiosulfate.

Technical yellow mercuric oxide is satisfactory for use in the reaction. Thereafter, mercuric oxide recovered from the by-product mercuric iodide may be used advantageously. The fact that mercuric iodide is inert in hydrofluoric acid, not being converted to mercuric fluoride and hydrogen iodide, is of great advantage in the process of this invention in that pentafluoroiodoethane of exceptional purity is obtained. The by-product mercuric iodide may be converted to mercuric oxide and iodine by known means, as described by E. Boll in Sueddeutsche Apotheker Zeitung, 88, No. 16, 453 (1948), whereby the mercuric iodide is oxidized in a hydrochloric acid slurry to iodine and mercuric chloride. Mercuric oxide is precipitated from the mercuric chloride solution with an alkali, such as sodium hydroxide. The iodine, obtained as a by-product in the recovery of mercuric oxide, may be reused in the manufacture of tetrafluoro-1,2-diiodoethane.

Theoretically, the reaction requires 1 mole of mercuric oxide for 2 moles of tetrafluoro-1,2-diiodoethane. In the process of this invention there may be used from about 1 to about 2.2 moles of mercuric oxide for each 2 moles of tetrafluoro-1,2-diiodoethane. At the higher temperatures of operation, it will be most convenient to employ 1 mole, or preferably a slight excess thereover, for each 2 moles of the tetrafluoro-1,2-diiodoethane. At the lower temperatures (60° C. or below), it will generally be desirable to employ the larger proportions of mercuric oxide so as to obtain the maximum yields in the shortest period of time.

The hydrogen fluoride, which is mixed with the mercuric oxide and the tetrafluoro-1,2-diiodoethane, preferably should be anhydrous technical hydrogen fluoride. In the course of the process, 2 moles of hydrogen fluoride react with each mole of the mercuric oxide to form 1 mole of water. Hydrogen fluoride, in excess of such 2 moles, dissolves in that water to form hydrofluoric acid. It has been found that, in the process of this invention, the concentration of the resulting hydrofluoric acid should not be less than 80% HF. Greater dilution produces unfavorable reaction conditions, with the result that the desired product is not formed. For example, the desired reaction does not take place when hydrogen fluoride gas is passed into and through a suspension of mercuric oxide in tetrafluoro-1,2-diiodoethane at atmospheric pressure, such procedure resulting in hydrofluoric acid having a concentration of not more than 50% HF.

The minimum amount of hydrogen fluoride, which can be used in the process of this invention, is that which produces a hydrofluoric acid concentration of at least 80%, which requires at least 6 moles of hydrogen fluoride for each mole of mercuric oxide present. There does not appear to be any upper limit to the amount of hydrogen fluoride which can be employed, but for practical, economic reasons, not more than about 40 moles of hydrogen fluoride will be employed ordinarily for each mole of mercuric oxide. Generally, it is preferred to employ from about 10 to about 25 moles of hydrogen fluoride for each mole of mercuric oxide.

The reaction should be carried out in a closed vessel at a temperature of from about 40° C. to about 125° C. and under autogenous pressure, the pressures being those of hydrogen fluoride and pentafluoroiodoethane at the reaction temperatures. When employing about 1 mole of mercuric oxide for each 2 moles of tetrafluoro-1,2-diiodoethane, the time required for substantial completion of the reaction will vary from about 24 hours at 40° C. to about 1 hour at 125° C., the preferred conditions being from about 90° C. to about 110° C. for about 2 hours. When it is desired to carry out the reaction at temperatures below about 90° C., larger amounts of mercuric oxide should be used in order to obtain maximum yields in short periods of time. Temperatures above 125° C. up to about 200° C. may be used, but are unnecessary and uneconomical. The reaction, converting tetrafluoro-1,2-diiodoethane to pentafluoroiodoethane, is exothermic. While the reactants can be mixed at the preferred higher temperatures by employing sufficiently efficient cooling, it is generally most convenient and preferred, particularly when operating on a large scale, to gradually add the tetrafluoro-1,2-diiodoethane to a mixture of the mercuric oxide and the hydrogen fluoride at a temperature at which the reaction will proceed smoothly and is easy to control, e.g., below 60° C., preferably between 30° C. and 60° C., and then heat the mixture to a temperature of from about 60° C. to about 125° C., preferably from about 60° C. to about 110° C., to complete the conversion of the tetrafluoro-1,2-diiodoethane to pentafluoroiodoethane.

The pentafluoroiodoethane can be recovered from the reaction mass by any conventional procedure. Conveniently, the reaction mass will be cooled to about 25° C. to about 30° C., the pentafluoroiodoethane (B.P. 13° C.) distilled from the reaction mass and the vapors thereof passed through water or an aqueous alkali solution to remove traces of hydrogen fluoride, dried, and condensed. Thereby, the pentafluoroiodoethane is obtained in a purity of at least 99.5%.

In order to illustrate this invention, preferred modes of practicing it, and the advantageous results to be obtained thereby, the following examples are given in which the parts and proportions are by weight, except where specifically indicated otherwise.

*Example 1*

265 parts of tetrafluoro-1,2-diiodoethane and 93 parts of technical yellow mercuric oxide was put into a shaker bomb and cooled in a mixture of Dry Ice and acetone. 180 parts of anhydrous hydrogen fluoride were added. The temperature of the charge was raised to 50° C. in three hours, then to 100° C. in one hour, and this temperature was then maintained for two hours. The pressure registered at 100° C. was 285 p.s.i.g.

The charge was cooled to 25° C.–30° C., and the pentafluoroiodoethane (B.P. 13° C.) was distilled from it and passed through a water scrubber to remove the hydrogen fluoride distilling with it, dried, and condensed. 148 parts of pentafluoroiodoethane of 100% purity by mass spectrometric analysis were obtained, equal to a yield of 80.6% of theory.

*Example 2*

172 parts of tetrafluoro-1,2-diiodoethane and 115 parts of mercuric oxide were put into a shaker bomb, and 180 parts of anhydrous hydrogen fluoride were added. The temperature of the charge was raised to 100° C. in three hours, and agitation was continued at 100° C. for three hours. Pentafluoroiodoethane was distilled from the charge at 25° C.–30° C. 100 parts of pentafluoroiodoethane were obtained (purity 100% by mass spectrometric analysis), equal to a yield of 81.4%.

The reaction mass, left after the distillation, was poured on 3000 parts of ice. The mercuric iodide which precipitated was filtered and slurried in hydrochloric acid. The iodine was recovered by oxidation with sodium nitrite, and mercuric oxide was recovered by adding sodium hydroxide to the mercuric chloride solution.

*Example 3*

1115 parts of mercuric oxide were put into an autoclave having a volume of 2500 cc. 1050 parts of anhydrous hydrogen fluoride were added. A cylinder, containing 1590 parts of tetrafluoro-1,2-diiodoethane, was connected to the autoclave and the tetrafluoro-1,2-diiodoethane was added to the autoclave in 15 minutes while the charge was cooled with cold (25° C.) water. The temperature of the charge rose to 58° C. during this addition. Heating was started after the temperature had dropped to 31° C. A temperature of 62° C. was reached in 30 minutes, and the charge was agitated at 60° C.–62° C. for twelve hours.

Upon the usual distillation, 1016 parts of pentafluoroiodoethane were obtained, equal to a yield of 92% of theory. The purity was 100% by mass spectrometric analysis. Due to the water formed in the course of the reaction, a 91.8% hydrofluoric acid resulted.

*Example 4*

A charge of 265 parts of tetrafluoro-1,2-diiodoethane, 186 parts of mercuric oxide, and 180 parts of anhydrous hydrogen fluoride were put into a shaker bomb. The temperature of the charge was raised to 60° C. in one hour, and maintained at 60° C. for one hour.

Upon the usual distillation, 164 parts of pentafluoroiodoethane were obtained, equal to a yield of 89.2% of theory.

*Example 5*

A charge of 265 parts of tetrafluoro-1,2-diiodoethane, 97 parts of mercuric oxide and 180 parts of hydrogen fluoride was raised to 60° C. in one hour, and agitated at 60° C. for one hour.

Upon distillation, 112 parts of pentafluoroiodoethane were obtained, equal to a yield of 61% of theory.

*Example 6*

A charge of 103 parts of iodine, 180 parts of hydrogen fluoride, 0.2 parts of hydroquinine and 0.2 parts of phenothiazine (polymerization inhibitors) was cooled in Dry Ice and acetone to about −50° C. and 60 parts of tetrafluoroethylene were added. The temperature of the charge was raised to 150° C. in two hours and this temperature was maintained for ten hours. The charge was then cooled to 0° C., and any excess or unreacted tetrafluoroethylene still present was vented off and swept out with nitrogen. 86 parts of mercuric oxide were then added, and the charge was heated to 125° C. for six hours. Upon the usual distillation, 80 parts of pentafluoroiodoethane were obtained, equal to a yield of 81% of theory based on the amount of iodine used and assuming that the iodine was quantitatively converted to tetrafluoro-1,2-diiodoethane.

*Example 7*

33.2 parts of HgO were put into an autoclave equipped with cold water cooling. 30.5 parts of anhydrous HF were added at 20° C.–50° C. with cooling. 47.4 parts of tetrafluoro-1,2-diiodoethane were added over a period of about three hours with agitation, maintaining the temperature between 40° C. and 60° C. The agitation was continued for an additional hour at 60° C. The reaction mixture was cooled, and pentafluoroiodoethane was isolated as described in the previous examples. 20.9 parts of pentafluoroiodoethane were obtained, equal to a yield of 89.6%.

The following Example 8 is included for purposes of comparison.

*Example 8*

A tube was charged with 10 grams of mercuric oxide and 30 cc. of tetrafluoro-1,2-diiodoethane. Hydrogen fluoride gas was passed through this charge at atmospheric pressure. The orange color of the mercuric oxide gradually changed to grey. The temperature of the charge was gradually raised to 85° C. The off-gas from the charge was scrubbed through water and aqueous KOH to absorb any hydrogen fluoride. Pentafluoroiodoethane was not obtained.

It will be understood that the preceding Examples 1–7 are given for illustrative purposes solely and that this invention is not limited to the specific embodiments described therein. On the other hand, it will be readily apparent to those skilled in the art that, subject to the limitations set forth in the general description, many variations and modifications can be made in the proportions, conditions, and techniques employed without departing from the spirit or scope of this invention.

From the preceding description, it will be apparent that this invention provides a new and improved process for preparing pentafluoroiodoethane in high yields and high purity from readily available starting materials. The process is simple and readily carried out and avoids the hazards involved in prior processes. Also, the process avoids side reactions which would consume starting material and desired products and produce undesired by-products. Therefore, it will be apparent that this invention constitutes a valuable advance in and contribution to the art.

The embodiments of the invention in which an exclusive property or privilege is claimed are defined as follows:

1. The process for preparing pentafluoroiodoethane which comprises heating to a temperature of from about 40° C. to about 125° C. in a closed vessel under autogenous pressure 2 moles of tetrafluoro-1,2-diiodoethane, from about 1 to about 2.2 moles of mercuric oxide, and at least 6 moles of hydrogen fluoride for each mole of mercuric oxide, and recovering pentafluoroiodoethane from the reaction mixture.

2. The process for preparing pentafluoroiodoethane which comprises heating to a temperature of from about 40° C. to about 125° C. in a closed vessel under autogenous pressure 2 moles of tetrafluoro-1,2-diiodoethane, from about 1 to about 2.2 moles of mercuric oxide, and from 6 to about 40 moles of hydrogen fluoride for each mole of mercuric oxide, and recovering pentafluoroiodoethane from the reaction mixture.

3. The process for preparing pentafluoroiodoethane which comprises heating to a temperature of from about 60° C. to about 125° C. in a closed vessel under autogenous pressure 2 moles of tetrafluoro-1,2-diiodoethane, from 1 to about 2.2 moles of mercuric oxide, and from 6 to about 40 moles of hydrogen fluoride for each mole of mercuric oxide, and recovering pentafluoroiodoethane from the reaction mixture.

4. The process for preparing pentafluoroiodoethane which comprises heating to a temperature of from about 40° C. to about 125° C. in a closed vessel under autogenous pressure 2 moles of tetrafluoro-1,2-diiodoethane, from 1 to about 2.2 moles of mercuric oxide, and from about 10 to about 25 moles of hydrogen fluoride for each mole of mercuric oxide, and recovering pentafluoroiodoethane from the reaction mixture.

5. The process for preparing pentafluoroiodoethane which comprises heating to a temperature of from about 60° C. to about 110° C. in a closed vessel under autogenous pressure 2 moles of tetrafluoro-1,2-diiodoethane, from 1 to about 2.2 moles of mercuric oxide, and from about 10 to about 25 moles of hydrogen fluoride for each mole of mercuric oxide, and recovering pentafluoroiodoethane from the reaction mixture.

6. The process for preparing pentafluoroiodoethane which comprises gradually adding 2 moles of tetrafluoro-1,2-diiodoethane to a mixture of from about 1 to about 2.2 moles of mercuric oxide and from 6 to about 40 moles of hydrogen fluoride for each mole of mercuric oxide in a closed vessel at a temperature below about 60° C., then heating the mixture to a temperature of from about 60° C. to about 125° C. under autogenous pressure to complete the conversion of the tetrafluoro-1,2-diiodoethane to pentafluoroiodoethane, and recovering pentafluoroiodoethane from the reaction mixture.

7. The process for preparing pentafluoroiodoethane which comprises gradually adding 2 moles of tetrafluoro-1,2-diiodoethane to a mixture of from 1 to about 2.2 moles of mercuric oxide and from 6 to about 40 moles of hydrogen fluoride for each mole of mercuric oxide in a closed vessel at a temperature below about 60° C., then heating the mixture to a temperature of from about 60° C. to about 110° C. under autogenous pressure to complete the converion of the tetrafluoro-1,2-diiodoethane to pentafluoroiodoethane, and recovering pentafluoroiodoethane from the reaction mixture.

8. The process for preparing pentafluoroiodoethane which comprises gradually adding 2 moles of tetrafluoro-1,2-diiodoethane to a mixture of from 1 to about 2.2 moles of mercuric oxide and from about 10 to about 25 moles of hydrogen fluoride for each mole of mercuric oxide in a closed vessel at a temperature below about 60° C., then heating the mixture to a temperature of from about 60° C. to about 110° C. under autogenous pressure to complete the conversion of the tetrafluoro-1,2-diiodoethane to pentafluoroiodoethane, and recovering pentafluoroiodoethane from the reaction mixture.

References Cited in the file of this patent
UNITED STATES PATENTS 2,552,263    Dickey _____ May 8, 1951